United States Patent [19]

Lindahl

[11] 4,402,851

[45] Sep. 6, 1983

[54] PUMPABLE COMPOSITION FOR WATER-PURIFYING PURPOSE CONTAINING IRON (II) SULPHATE, AND A METHOD FOR PRODUCING THE SAME

[75] Inventor: Gertrud M. Lindahl, Helsingborg, Sweden

[73] Assignee: Boliden Aktiebolag, Stockholm, Sweden

[21] Appl. No.: 338,067

[22] Filed: Jan. 8, 1982

[30] Foreign Application Priority Data

Jan. 13, 1981 [SE] Sweden .................... 8100161

[51] Int. Cl.³ ................................. C02F 5/10
[52] U.S. Cl. ....................... 252/181; 252/175; 252/179; 252/363.5; 210/710; 210/716; 210/717; 210/722; 210/726; 210/738
[58] Field of Search ........... 252/175, 179, 181, 363.5; 210/696, 710, 716, 717, 722, 726, 738

[56] References Cited

U.S. PATENT DOCUMENTS

| | | | |
|---|---|---|---|
| 1,440,253 | 12/1922 | Travers | 210/52 |
| 2,362,409 | 11/1944 | Samuel | 252/181 |
| 2,771,342 | 11/1956 | Lamanna | 23/126 |
| 3,082,173 | 3/1963 | Horvitz | 252/181 |
| 3,097,163 | 7/1963 | Riddick | 210/726 |
| 3,183,186 | 5/1965 | Oster | 210/52 |
| 4,180,459 | 12/1979 | Zievers | 210/710 |
| 4,292,085 | 9/1981 | Piccolo et al. | 423/555 |

FOREIGN PATENT DOCUMENTS

| | | |
|---|---|---|
| 17634 | 10/1980 | European Pat. Off. . |
| 1285416 | 12/1968 | Fed. Rep. of Germany . |
| 2021826 | 11/1974 | Fed. Rep. of Germany . |
| 2739715 | 3/1978 | Fed. Rep. of Germany . |
| 2436107 | 9/1979 | France . |
| 55-34173 | 3/1980 | Japan . |
| 344454 | 4/1972 | Sweden . |
| 354054 | 2/1973 | Sweden . |
| 613917 | 10/1979 | Switzerland . |

*Primary Examiner*—John E. Kittle
*Assistant Examiner*—Hoa Van Le
*Attorney, Agent, or Firm*—Brumbaugh, Graves, Donohue & Raymond

[57] ABSTRACT

A pumpable water-purifying dispersion containing iron-(II)sulphate, the iron(II)sulphate being dispersed in an aqueous phase with a dispersing agent containing an alkaline earth metal and a basic anion. The best dispersion properties are obtained when the dispersing agent is calcium carbonate or calcium hydroxide, whereby the resultant composition having a content of up to about 70% solid iron(II) sulphate, calculated as heptahydrate on the total weight of the composition, can be obtained and handled without difficulty. The aqueous phase can, to advantage, comprise metal ions active in water-purification, such as $Fe^{2+}$, $Fe^{3+}$ and $Al^{3+}$.

The invention also provides a method for producing the composition.

10 Claims, No Drawings

4,402,851

PUMPABLE COMPOSITION FOR WATER-PURIFYING PURPOSE CONTAINING IRON (II) SULPHATE, AND A METHOD FOR PRODUCING THE SAME

TECHNICAL FIELD

The invention relates to a water-purifying composition containing iron(II)sulphate, and a method for producing such a composition.

An object of the present invention is to provide a water-purifying agent which has a high divalent-iron content deriving from solid iron(II)sulphate, and which agent can be handled, transported, dispensed, and metered without encountering the difficulties mentioned below. Another object is to provide a market for the waste product iron(II)sulphate heptahydrate.

BACKGROUND OF THE INVENTION

Sulphate of divalent iron in the form of $FeSO_4.7H_2O$, i.e. iron(II)sulphate heptahydrate, is a fatal product obtained, inter alia, in pickling baths used to treat iron and steel and based on sulphuric acid, and in the manufacture of titanium dioxide from titanium ores containing iron, primarily ilmenite, iron sulphate being removed from a sulphate solution by crystallizing precipitation by cooling. At present, it is necessary to dump large quantities of iron(II)sulphate heptahydrate, which, because this compound readily dissolves in water, creates a serious problem, and hence special safety precautions must be taken to prevent contamination of the surrounding water and groundwater. Further the physical properties of iron(II)sulphate heptahydrate are so poor that it is difficult to handle, since when handled it tends to agglomerate into a sticky mass which cannot readily be stored in normal storage plants, for example silo-type storage units. Neither can it be transported, dispensed or metered by means of conventional apparatus intended for use with solid, powderous products.

Even though iron(II)sulphate heptahydrate may have a high potential as a water-cleansing agent, it has been found that there is only a limited demand for this product by the technicians running the purification plants. This most probably due to the aforementioned problems encountered when handling the product. One way of making the product more attractive for use as a water-purifying agent is to heat it, to form a monohydrate, which has far superior physical properties compared to heptahydrate. Since large quantities of energy are required in the manufacture of such a product, this is far more expensive and thus does not create a positive solution to the problem of eliminating fatal iron(II)sulphate heptahydrate. Iron(II)sulphate heptahydrate products could also be used as a water-purifying agent in a solubilized state, thereby avoiding the aforementioned handling- and dosaging problems. It is not possible, however, for an iron(II)sulphate heptahydrate aqueous solution to contain more iron than about 2.9%, calculated on the weight of the solution, which is far from satisfactory with regard to transportation, since this means that large quantities of water must be transported together with the water-purifying iron sulphate. This increases the cost of transportation to such an extent that only those water-purifying plants located in the vicinity of the source of the fatal iron(II)sulphate heptahydrate products may be served economically.

DISCLOSURE OF THE INVENTION

It is also known in the prior art to use iron(II)sulphate in an aqueous solution together with calcium ions derived from calcium oxide, calcium chloride, or calcium hydroxide (CH,A, 613,917; DE,B, 1,285,416; US,A, 1,440,253; US,A, 3,183,186; SE,A, 344,454; SE,A, 354,054). The calcium ions thereby improve the purifying effect with respect to the reduction of organic substances and phosphorous compounds. It is also known that concrete corrodes considerably less when ions of alkaline earth metals are present in the water-purifying agents.

The calcium ions are hereby present in order to increase flocculation whereby the weight ratio of $CaO:FeSO_4$ is 100:30 (SE,A, 354 054). In the method described in DE,A, 2.739.715 0.1–0.3 equivalents of iron as iron sulphate is added per 1 equivalent of calcium, i.e. calcium is used in excess to the iron. As a standard when purifying waste water 30 g of iron sulphate and 100 g of lime are used per cubic meter of water; and when dewatering sludge 3.6–9.3 kg or iron sulphate and 19–28 kg of lime are used per cubic meter, or 10–15% by weight of iron sulphate and 30% by weight of lime calculated on the drysubstance weight of the sludge.

It is further known to produce non-calcing copperas (US,A, 2,771,342) whereby iron(II)sulphate heptahydrate is heated to 60° C. for a time sufficient to dehydrate the heptahydrate to pentahydrate, and whereby sulphuric acid present in the copperas is neutralized with calcium carbonate to form the non-dispersing compound calcium sulphate. Such a dried copperas can be used as a flocculant whereby as dried it is easily handled. It cannot be dispersed per se.

It has now surprisingly been shown that a pumpable dispersion of solid iron(II)sulphate can be obtained whereby the dispersion agent is an alkaline earth metal having a basic anion, i.e. calcium hydroxide calcium oxide, calcium carbonate, dolomite barium hydroxide, barium oxide, barium carbonate and corresponding strontium compounds. Thus a previously used flocculating agent is used to defflocculate, i.e. disperse, solid iron(II)sulphate.

The dispersion obtained can be used for dispensing iron(II)sulphate into a waste water purification system, whereby the dispersion is added in such amounts that the solid iron(II)sulphate is dissolved in a dispensing water or in the waste water as such. Subsequent to adding the aforesaid dispersing agent, the suspension exhibits but slight settling tendencies, even though the solid sulphate may have a relatively large particle size, and hence it is not necessary to grind or otherwise disintegrate the sulphate to a finer particle size prior to adding the dispersing agent. Such stable suspensions are commonly referred to as dispersions.

One important advantage afforded by the invention is that the composition can be readily made still more effective, by maintaining in the water phase of the composition one or more of the ions $Fe^{2+}$, $Fe^{3+}$, and $Al^{3+}$ in an amount which renders the composition effective from a water-purifying point of view. Thus, the water phase may comprise, to advantage, an aqueous solution of iron(III)chloride, which solution is commercially available and used for water-purifying purposes. In addition to the effect afforded by Fe (II) when purifying water, an additional water-purifying effect can also be obtained through the action of the components Fe (III) and/or Al (III). The latter ions are good precipitating agents for, inter alia, phosphate ions, heavy metals, bacteria, virus and eggs of intestinal larvae, and because of their excellent flocculating properties a clear output of water is provided. All suspended material in the water is thereby flocculated as well. A further advantage afforded by the invention is that the composition contains ions of alkaline earth metals, such as calcium ions. As indicated above it is known that the addition of such ions when purifying water with iron(II)sulphate improves the purifying effect with respect to the reduction of organic substances and phosphorous compounds. It is also known that concrete corrodes considerably less when ions of alkaline earth metals are present in the water-purifying agents.

Thus, the composition comprises a dispersion which has good stability, and can be handled and dispensed as a liquid, for example by pumping, which is an obvious advantage for a water-purifying agent. The dispersing agent in the composition is suitably a calcium compound, preferably calcium carbonate, calcium hydroxide, calcium oxide or dolomite.

A further obvious advantage afforded by the composition according to the invention is that it can contain relatively high contents of active iron(II)ions calculated on the total weight, compared with an aqueous solution of iron(II)sulphate. The vicosity of the dispersion increases, however, with an increasing content of solid iron(II)sulphate, and there is a practical limit above which the dispersion cannot be handled but with difficulty. Thus, it is preferred to use a composition containing less than about 70% solid iron(II)sulphate calculated as heptahydrate on the total weight of the composition. The amount of dispersing agent required to obtain effective dispersement is surprisingly low and is suitably balanced against the requirements placed on the durability and stability of the dispersion. Thus, the amount of dispersing agent in the composition is preferably such that the ratio between the number of moles of alkaline earth metal in the dispersing agent and the number of moles of iron(II)sulphate is about 0.05–0.20. A ratio which is greater than the upper limit of the aforegiven range results in the formation of lumps and the solidification of the composition, while a ratio below the lower limit of about 0.05 is not sufficient to enable an effective durable dispersion to be obtained. It has been found that a particularly stable dispersion is obtained with a composition containing about 60% iron(II)sulphate, calculated as heptahydrate, and about 1.5–2% calcium carbonate in an approximately 3 M aqueous solution or iron(III)chloride. The composition will thus contain 17.3% iron in total, whereby 13.3% is Fe(II) in iron sulphate and 4.0% is Fe(III) in the solution. Thus, the total iron content of the composition according to the invention is much higher than the iron content of an aqueous solution of iron(II)sulphate, which, as previously mentioned, is only 2.9% iron in a saturated solution.

According to another, further embodiment of the composition of the invention it can contain a further dispersing agent as pectin, potatoe starch, wheat starch, rice starch, corn starch, and xanthan gum. Potatoe and wheat starch have shown to provide excellent properties to the dispersion when added in amounts of 0.5–2% by weight calculated on the content of the iron(II)sulphate.

The composition is produced in accordance with the invention starting from solid iron(II)sulphate, for example and preferably in the form of the heptahydrate, the method being characterized by mixing the starting material being in a finely-divided state, water or an aqueous solution, and a dispersing agent comprising an alkaline earth metal and basic anion; and by stirring the mixture for as short a time as possible, to the formation of a homogenous dispersion. It has been found that the particle size of the starting material can vary within relatively wide limits, although it is preferred to use a starting material having a particle size smaller than about 2 mm. When mixing the components of the composition, it has shown advantageously firstly to add the iron(II)sulphate to the water phase while stirring and then to add the dispersing agent, whereafter the mixture is stirred for at most 5 minutes, preferably for at most 3 minutes. Thus, the stirring subsequent to adding the dispersing agent is important to the stability of the composition, and if stirring is continued for too long a period, the good stability properties already obtained can be impaired. The intensity of the stirring is not, on the other hand, critical, provided that the time period over which the mixture is stirred is adapted with respect to said intensity. Consequently, it is not possible to give an exact, critical time period for stirring, since the time period is also dependent on other factors, such as the stirring rate and the stirring geometry. However, stirring times in excess of five minutes at intensive stirring have been found to impair the stability of the dispersion.

BEST MODE OF CARRYING OUT THE INVENTION

The invention will now be illustrated by means of a number of Examples relating to tests carried out to produce dispersions of solid iron(II)sulphate heptahydrate in different ways, whereat Examples A and B illustrate compositions lying outside the scope of the invention, while Examples 1–2 illustrate compositions according to the invention.

EXAMPLE A

Ground and unground solid iron(II)sulphate heptahydrate, $FeSO_4.7H_2O$, were intensively mixed in a mixer with an aqueous solution of iron(III)chloride containing 12% by weight Fe. The different phases of all mixtures, containing solely these two components, separated within 12 hours, to form a hard bottom layer. The mixing ratios between $FeSO_4.7H_2O$ and the iron-chloride solution were varied within the range of 1–3 (g/g), while the mixing times were varied between 0.25 and 10 minutes.

EXAMPLE B

Various chemicals were added to the mixtures obtained in accordance with Example A, each total mixture being intensively stirred in a mixer.

Alternatively, the sulphate was added to a mixture of iron-chloride solution and additive chemicals.

The additive chemicals used in this test comprised wetting agents and organic high-molecular polymers of a nonionic, anionic and cationic nature, i.e. substances known as dispersing agents in other contexts, such as in the context of producing coal-water slurries. The mixing ratios between the sulphate and the chloride solution were varied within the range of 1.5–3 (g/g) and the amounts of chemicals added were varied between 0.07 and 0.7%, i.e. additive quantities active in other contexts. The mixing times were varied between 1 and 10 minutes as well.

Similarly, additions of inorganic substances, such as soda ($Na_2CO_3$), were made in quantities corresponding to about 1–4%; and calcium chloride ($CaCl_2.2H_2O$) in quantities corresponding to 0.8–1.6%, all calculated on the weight of the iron(II)sulphate.

None of the mixtures prepared, however, exhibited dispersion properties, and consequently a hard bottom layer was found in all mixtures after only 20 hours, with the exception of mixtures having the highest contents of soda or calcium chloride, all of which mixtures, however, had solidified and formed a single lump.

EXAMPLE 1

The tests according to Example B were repeated, but with the addition of a dispersing agent comprising an alkaline earth metal and a basic anion, such as calcium carbonate and calcium hydroxide. The additions were varied between 1.2 and 4.8%, calculated on the weight of iron sulphate, and the mixing times were varied, as in Example B, between 1 and 10 minutes. Both ground and unground iron(II)sulphate heptahydrate were used in the tests, but no significant difference could be observed with regard to their performance in the composition. Similarly to Example B, the order in which the additives were added was varied to obtain the following sequences;

$FeCl_3$-dispersing agent-$FeSO_4.7H_2O$
$FeSO_4.7H_2O$-$FeCl_3$-dispersing agent; and
$FeSO_4.7H_2O$-dispersing agent-$FeCl_3$.

With a sulphate/chloride ratio of 1.5 with an addition of up to 3.2% of calcium there were obtained non-precipitating, mixtures being stable after 24 hours, while mixtures having a higher ratio than 1.5 showed lumps therein at higher calcium additions than about 2%. After one month those mixtures having 2% or less calcium, which had not been stirred for longer than 3 minutes, and in which the additive sequence was iron sulphate-iron chloride-calcium compound, were found to give the best results.

When using $Ca(OH)_2$ as the dispersing agent, the best results were obtained in tests using $Ca(OH)_2$ in an amount corresponding to 2% calcium calculated on the weight of the iron(II) sulphate, which in turn was 1.5 times the weight of the iron-chloride solution, and in which the iron sulphate was first added to the chloride solution, whereafter the calcium hydroxide was added, followed by stirring for from 1 to 3 minutes. A correspondingly best result was obtained in the case of calcium carbonate when the amount of calcium carbonate added corresponded to 1.2% calcium calculated on weight of the iron(II)sulphate, the weight relatioship between iron(II)sulphate (calculated as heptahydrate) and the iron-chloride solution being between 1.5 and 2, with stirring time between 1 and 3 minutes, with the additives being introduced in the same order sequence.

EXAMPLE 2

A dispersion of solid iron(II)sulphate was prepared as follows: A first solution of 90 g of iron(III)chloride in 200 ml of water was prepared whereafter 120 g iron(II)sulphate heptahydrate were added while slowly stirring. 1.8 g of calcium carbonate were then added whereafter 1.2 of wheat starch were added. The total mixture was stirred for 3 min. The dispersion obtained showed excellent properties without any precipitating tendencies after 2 months.

I claim:

1. A dispersion of a water-purifying composition wherein solid iron(II)sulphate is dispersed in an aqueous phase with a dispersion agent comprising an alkaline earth metal and a basic anion.

2. A dispersion according to claim 1, characterized in that the aqueous phase includes one or more of the ions $Fe^{2+}$, $Fe^{3+}$ and $Al^{3+}$.

3. A dispersion according to claim 2, characterized in that the aqueous phase is an iron(III)chloride solution.

4. A dispersion according to claim 1, wherein the dispersion agent further comprises a calcium compound selected from the group consisting of calcium carbonate, calcium hydroxide, calcium oxide and dolomite.

5. A dispersion according to claim 1, further comprising up to about 70% solid iron(II)sulphate, calculated as heptahydrate on the total weight of said composition.

6. A dispersion according to claim 1, wherein the dispersion agent is present in a quantity such that the ratio between the number of moles of alkaline earth metal in the dispersion agent and the number of moles of iron(II)sulphate is about 0.05–0.20.

7. A dispersion according to claim 1, further comprising about 60% iron(II)sulphate, calculated as heptahydrate, and about 1.5–2% calcium carbonate in approximately 3 M aqueous solution of iron(III)chloride.

8. A dispersion according to claim 1, wherein the dispersion agent further comprises a second dispersion agent selected from the group consisting of pectin, wheat starch, potato starch, rich starch, corn starch and xanthan gum.

9. A method for producing a dispersion of a water-purifying composition which comprises mixing a solid iron(II)sulphate starting material in a finely-divided state together with an aqueous solution, and with a dispersion agent comprising an alkaline earth metal and a basic anion, and stirring said mixture for the shortest possible time to form a homogeneous dispersion.

10. A method according to claim 9, which further comprises adding the iron(II)sulphate to the aqueous solution whilst stirring, whereafter adding said dispersion agent and stirring said mixture for at most 5 minutes.

* * * * *